Sept. 28, 1926.  
C. SCHAEFFER  
PEDAL WITH DOUBLE PIVOT JOINT  
Filed July 3, 1926
1,601,649
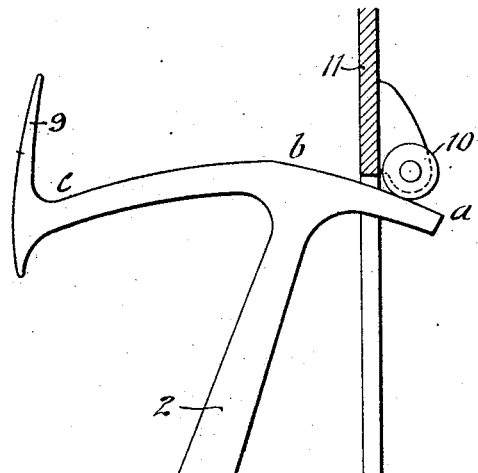
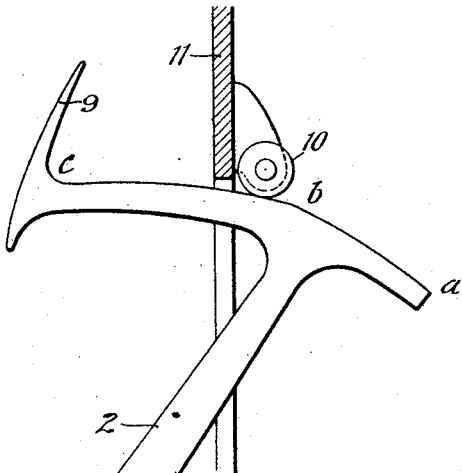

Patented Sept. 28, 1926.

1,601,649

UNITED STATES PATENT OFFICE.

CHARLES SCHAEFFER, OF PARIS, FRANCE, ASSIGNOR TO SOCIETE ANONYME DES ANCIENS ESTABLISSEMENTS PANHARD & LEVASSOR, OF PARIS, FRANCE.

PEDAL WITH DOUBLE-PIVOT JOINT.

Application filed July 3, 1926, Serial No. 120,493, and in France July 6, 1925.

In motor vehicles it is the custom to employ pedals for the control of the brakes and the clutches, and the stroke as well as the effort to be exercised by the driver are about the same for all vehicles. It follows that the effort which can be imparted to the brakes or clutches is limited by the reduction ratio of the stroke in use, and in this manner there will be lost a certain amount of the pedal stroke during the period of taking up the wear in which the effort to be exercised is but small.

The present invention relates to a pedal with double pivot, which is so disposed that the reduction ratio will be small during the period corresponding to the taking up of the wear and will then increase automatically so as to increase the effort when the wear has been taken up.

The appended drawing shows by way of example a constructional form of pedal according to the invention.

Fig. 1 shows the pedal at the beginning of the first period, in side elevation, and, Fig. 2 is a like view showing the pedal in a position for great reduction ratio.

The pedal is divided into two parts 1 and 2 which are pivoted together by the axle 3 which is parallel to the main pivot axle 4. The part 1 pivoted to this latter axle is relatively short; the second part is bent into a Z-shape and is connected with the first by a spring 5 urging it against a stop 6 provided on the part 1. The pedal controls the brake, or the clutch, through rod and link gear 7 which is pivoted at 8 to the part 2. In the inoperative position shown in Fig. 1, the part 2 is urged against the stop 6 by the action of the spring 5. If the driver pushes the pedal with his foot, at the end 9, the pedal will first swing as a whole, since only a small resistance is offered by the rod and link gear during the period of taking up the wear. But at the end of this period and when the resistance becomes relatively great, the part 2 will tend to swing about the pivot 8, thus overcoming the action of the spring 5; this latter will yield, and the part 2 will recede from the stop 6, and will pivot on the axle 3. In this manner the reduction ratio of the stroke, which depended during the first period upon the distance between the longitudinal axis of the rod 7 and the main axis 4, will now depend upon the distance between said longitudinal axis and the secondary axis 3 of the pedal. It subsequently becomes greater, and the effort on the rod and link gear is thus increased. If desired, the swing of the part 1 may be limited by a suitable stop.

Should the spring break, the ratio may increase as soon as the pedal is moved, and to avoid this, I prefer to give the upper part of the pedal the shape of two arcs of a circle $a\ b$ and $b\ c$, whereof the first is concentric with the axle 4 and the second with the axle 3, and I dispose a frictionless guiding element, for instance a roller 10, a ball or the like, which is mounted on the fixed dashboard 11 or upon a like fixed support, so as to bear upon the outline $a\ b\ c$. During the period of taking up the wear, the guiding of the arc $a\ b$ against the roller 10 will prevent the part 2 from leaving the stop 6 even should the spring 5 be broken. When the point $b$ has cleared the roller 10, the part 3 will be free to swing on the axle 3 which has now become stationary.

Obviously, without departing from the principle of the invention, I may employ any other guiding means, and may vary the shapes and proportions of the different parts of the pedal device which is shown solely by way of example.

Having thus described my apparatus, what I claim as new therein, and my own invention, is:—

1. A pedal for the control of the brakes and like elements, comprising in combination a first part adapted to be actuated by the foot, a movable axle adapted to carry the said first part and upon which the said part may swing, rod and link gear pivoted to the said first part, a second part pivoted to the first part by means of the said movable axle, a stationary axle adapted to receive the second part and upon which the second part is enabled to swing, a traction spring disposed on one side of the said movable axle and adapted to connect the said first part with the said second part, and to bring the first part near the said stationary axle, and a stop disposed upon the said first part for arresting the said first part when urged by the said spring.

2. A pedal for the control of the brakes and like elements, comprising in combination a first part adapted to be actuated by the foot, a movable axle adapted to carry the said first part and upon which the said part may swing, rod and link gear pivoted to the said first part, a second part pivoted to the first part by means of the said movable axle, a stationary axle adapted to receive the second part and upon which the second part is enabled to swing, a traction spring disposed in one side of the said movable axle and adapted to connect the said first part with the said second part, and to bring the first part near the said stationary axle, and a stop disposed upon the said first part for arresting the said first part when urged by the said spring, the said first part having a Z shape whereof the upper branch forms two arcs of a circle, the arc farthest from the operating point being concentric with the said movable axle and the arc nearest the operating point of the foot being concentric with the said stationary axle, and a stationary guiding element coacting with the outline of the branch forming the two circular arcs.

In testimony whereof I have hereunto affixed my signature.

CHARLES SCHAEFFER.